United States Patent [19]

Entzmann et al.

[11] 4,177,052

[45] Dec. 4, 1979

[54] PROCESS FOR PREPARING DICALCIUM PHOSPHATE CONTAINING FERTILIZER

[76] Inventors: Karl Entzmann, A-8672 St. Kathrein, Austria; György Kálmán, Ságvári endre u. 15., Tatabánya I., Hungary; Janos Varga, Kolbai k. u. 4., Mosonmagyaróvár, Hungary; Vecsei, Miklós Terffy Gy. u. 34., Komárom, Hungary; Gabor Jankovics, Ifjúmunkás u. 29., Tatabánya v., Hungary; Lászlóné Kozicz, Mártirok u. 86., Tatabánya, Hungary

[21] Appl. No.: 902,931

[22] Filed: May 5, 1978

[30] Foreign Application Priority Data

May 6, 1977 [HU] Hungary .............................. TA 1439

[51] Int. Cl.$^2$ .................................................. C05B 3/00

[52] U.S. Cl. ............................................ 71/33; 71/49; 71/64 DA; 423/167

[58] Field of Search ..................... 71/33, 48, 43, 64 C, 71/42, 64 DA, 64 DB, 49, 64 DC; 423/308, 167, 311, 307, 315

[56] References Cited

U.S. PATENT DOCUMENTS

| | | | |
|---|---|---|---|
| 931,846 | 8/1909 | Connor | 71/42 X |
| 2,776,198 | 1/1957 | Turbett | 71/33 X |
| 2,908,561 | 10/1959 | Seymour | 71/33 |
| 3,129,092 | 4/1964 | Legal et al. | 71/64 DA |
| 3,676,100 | 7/1972 | Gerhardt et al. | 71/64 C X |
| 3,679,390 | 7/1972 | Young | 71/64 C X |
| 4,113,842 | 9/1978 | McCullough et al. | 71/33 X |

FOREIGN PATENT DOCUMENTS

| | | | |
|---|---|---|---|
| 38-7062 | 5/1963 | Japan | 71/33 |
| 910924 | 11/1962 | United Kingdom | 423/308 |

*Primary Examiner*—Kenneth M. Schor

[57] ABSTRACT

There is disclosed a process for preparing fertilizers containing dicalcium phosphate from phosphates of mineral origin by mechanical activation. According to the invention grains larger than 5 mm of the sized or unsized starting phosphate compound of mineral origin are granulated up to a grain size of 1 to 4 mm, the granulated phosphate obtained is admixed with monocalcium phosphate and the phosphate crystals are activated by colliding the grains of the mixture at a speed of 70 to 120 m/sec.

The fertilizer prepared according to the invention possesses numerous advantages over the known phosphate fertilizers from technological and applicational point of view as well.

9 Claims, No Drawings

PROCESS FOR PREPARING DICALCIUM PHOSPHATE CONTAINING FERTILIZER

This invention relates to a process for preparing by mechanical activation, fertilizers containing dicalcium phosphate from phosphates of mineral origin.

Phosphate-type fertilizers always contain soil-soluble $P_2O_5$ which is available for the plants. These fertilizers are manufactured from mineral phosphates, e.g. apatite, fluorite, in which phosphorus is present in form of compounds insoluble in the soil. The mineral raw phosphates must therefore be subjected to a suitable treatment to transform the phosphorus into a form available to the plants.

There are numerous methods known in the art for the preparation of phosphate fertilizers. Most of these processes afford either superphosphate or the so called triplephosphate as an end product. A common feature of the two kinds of processes is an acid digestion step. When superphosphate is to be prepared, sulphuric acid is generally used for acid digestion. In the case of triplephosphate, acid digestion is usually carried out with phosphoric acid. Depending on the quality of the starting material, superphosphates generally contain about 18 to 21% of active ingredient ($P_2O_5$), whereas the $P_2O_5$ content of triplephosphate is usually about 43 to 50%.

According to a process described in U.S. Pat. No. 3,928,016, phosphate fertilizers are prepared in an aqueous medium by heating the starting material in the presence of a metal salt catalyst. Before subjecting the starting material to heat treatment, it must be ground to a grain size less than 200 mesh and the catalyst must be employed in very large quantities, i.e. in a quantity of about 1 to 30 kg/1 ton of raw phosphate. Colloidal substances must be precipitated from the end product and the product should be subsequently dried.

According to other processes, silicic acid is added to the phosphate-containing rock which is then heated to a high temperature (at least 1200° C.) in the presence of an alkaline substance.

The end products obtained by these and similar processes contain water-soluble monocalcium phosphate as a main component accompanied by sufficiently less dicalcium phosphate, which can be dissolved in ammonium citrate, and occasionally by calcium sulphate, the latter diluting the $P_2O_5$ content. The mixture of these components is called either superphosphate or triplephosphate, depending on the quantity of the active ingredient. Triplephosphate consists of the same components as superphosphate but contains about three-times as much active ingredient.

It is well known that, when the soil contains a sufficient amount of lime and is devoid of other materials which are able to precipitate monocalcium phosphate, the monocalcium phosphate component of superphosphate is transformed, after fertilization, into citrate-soluble dicalcium phosphate and in such manner is transformed into an inert material not available to the plants. By this transformation, the danger of leaching the fertilizer is avoided. It is advisable to directly apply dicalcium phosphate onto the soil, since the above transformation of monocalcium phosphate into dicalcium phosphate is strongly dependent on the soil composition and is therefore difficult to control.

The various methods known in the art for the preparation of pure dicalcium phosphate, involve cumbersome steps of multiple precipitation, filtration and drying, which in turn result in a much more complicated and expensive technology than the manufacture of superphosphate. Because of these technological problems and economic disadvantages, instead of dicalcium phosphate, superphosphate is widely prepared and used in agriculture, in spite of the fact that it is less or only restrictedly available to the plants.

A common drawback of all known methods is that they are expensive and their chemical and equipment requirements are high. The reaction steps involved are cumbersome and time-consuming. In other known processes strong mineral acids and bases are employed and/or the reactions are carried out at a high temperature. These facts result in a complicated technology and the equipment is made of expensive materials. The large-scale realization of these processes is also difficult and makes special precautions and preparations necessary.

The object of the present invention is to provide a process for preparing, by mechangical activation, a dicalcium phosphate-containing fertilizer starting with phosphates of mineral origin. The fertilizer prepared in this way is directly available to the plants, soluble in citrates and consequently has a more prolonged effect after fertilization. Its active ingredient concentration is higher than that of superphosphate. The process according to the invention is devoid of the above-described disadvantages of the known processes, and is simpler and cheaper since the phosphorus content of the raw phosphates is transformed into a well-assimilable form without an acid treatment and in a dry manner.

According to the process provided by this invention, raw phosphate is optionally sized, the grains having a size larger than 5 mm are granulated to a grain size of 1 to 4, preferably 2 to 3 mm, the crude phosphate is admixed or homogenized with monocalcium phosphate and the grains of the mixture are caused to collide at a speed of 70 to 120 m/sec, preferably 80 to 100 m/sec, whereby the crude crystals are activated.

According to a preferred embodiment of the invention, monocalcium phosphate is used in a stochiometric amount calculated for the transformation of tricalcium phosphate into dicalcium phosphate. Activation is accomplished by combining shearing and/or pressing or collision stresses. For this purpose beater-blade mills—preferably having a disintegrator system—can be used most advantageously. As monocalcium phosphate, any commercially available superphosphate can be employed.

The dicalcium phosphate-containing fertilizer can be supplemented with a fertilizer base containing nitrogen and/or potassium and optionally with water to give a complex fertilizer.

The process according to the invention is essentially based on the recognition that dicalcium phosphate can be directly prepared from a raw phosphate of mineral origin when a pre-determined amount of monocalcium phosphate is added to the raw phosphate before activation. It is advisable to use raw phosphate and monocalcium phosphate in a mutual proportion corresponding to the equation of tricalcium phosphate + monocalcium phosphate = dicalcium phosphate.

During the activation, as a result of the mechanical energy transferred to the particles, the energy content of the raw phosphate—monocalcium phosphate system is increased. Thereby not only the heat energy content of the mixture is modified but also the crystal structure of the raw phosphate undergoes certain changes, i.e. crystal defects are formed in the crystal lattice. The defects are not localized on the surface of the grains but extend to the inner part of them and modify the physical and chemical characteristics of the crystals.

Activation is carried out by leading the premixed mixture into a room, where grains are caused to collide at a high speed. It is most probable that the collisions loosen the crystal structure of the crude phosphate to such an extent that a chemical reaction may take place.

Monocalcium phosphate at first acts as a catalyst of the transformation of raw phosphate into dicalcium-phosphate and then is built into the dicalcium phosphate formed. A single collision is able to ensure the energy necessary to the chemical reaction; however, in the equipments used for the purpose of this invention grains advantageously collide several times. The time interval between the subsequent collisions is very small and therefore there is no possibility of a reverse process between two collisions. The grains leaving the collision zone of the field are in a stable state corresponding to the amended chemical composition and keep this form during further treatment. As a consequence of the advantageously multiple collisions, grains will be excited into a higher energy state and phosphorus can therefore be absorbed by the plants easier and much more effectively.

Raw phosphate and monocalcium phosphate should not necessarily be employed in a stochiometric proportion as described above. When one of the components is employed in an excess amount, the activation takes place and the excess amount of monocalcium phosphate or raw phosphate remains unchanged during activation. A high energy state of raw phosphate can be achieved also without a monocalcium phosphate catalyst, but the transformation into dicalcium phosphate does not take place.

It has been found that activation can be observed already at a collision speed of 40 m/sec. It is advantageous, however, to work in the range of 70 to 140 m/sec, because in this range the mechanical energy transferred to the particles is sufficient to allow the formation of stable dicalcium phosphate. It has also been found that over a speed limit secondary reactions take place (for example transformation into amorphous material) which inhibit the formation of dicalcium phosphate. This speed limit is about 140 m/sec. The formation of dicalcium phosphate can be proved by X-ray diffraction measurements.

It is surprising that dicalcium phosphate activated at a collision speed of 80 to 100 m/sec has an optimum energy state, as determined in various biological tests, on the $P_2O_5$ absorption of plants. We have found that plants draw a 6% greater amount of $P_2O_5$ from dicalcium phosphate activated according to the invention than from superphosphate having the same active ingredient concentration. It is apparent from this test that dicalcium phosphate activated into the optimum energy level can be utilized by plants easier and more effectively.

The technological and economical advantages of the process according to the invention—which are important with respect to the preparation and the utilization of the product as well—are summarized hereinbelow.

TECHNOLOGICAL ADVANTAGES (1) The complicated and expensive steps of acid digestion and subsequent "ripening" can be avoided, i.e. restricted to the preparation of monocalcium phosphate. During the production no gaseous substances are evolved to pollute the environment. The process can be performed at room temperature. The substances used as starting materials are commercially available products.

(2) Any commercially available, usual grade, superphosphate can be used as monocalcium phosphate.

(3) During mechanical activation, the calcite contained in the raw phosphate also becomes activated. The activated calcite is especially advantageous for sour lands. When applied to other lands, it acts as an inert material and its presence is therefore not detrimental.

(4) A considerable amount of sulphuric acid can be saved, since acid digestion is employed only during the production of monocalcium phosphate. This also means a sufficient saving in production and transportation costs.

(5) Assuming that the capacity of the superphosphate producing unit is unchanged, the quantity of the phosphate fertilizer which may be prepared by mechanical activation is doubled.

(6) The transportation of raw phosphate into the manufacturing factory and of the end product to the site of application can be avoided since the dicalcium phosphate fertilizer can be directly prepared in the districts where there is the highest demand for these type of fertilizers.

FURTHER ADVANTAGES WITH RESPECT TO APPLICATION (1) Dicalcium phosphate prepared by mechanical activation is a neutral salt, which is not hygroscopic, has good storability, is essentially insoluble in water and is therefore not detrimental to the soil. This fertilizer consequently has a more permanent effect that known fertilizers having a similar active ingredient. It is non thixotropic. Its active ingredient content is 27 to 30% ($P_2O_5$), i.e. about 9 to 12% higher than that of the traditionally used superphosphate.

(2) The production costs of the fertilizer prepared according to the invention are sufficiently lower than those of superphosphate.

(3) In the case of dicalcium phosphate fertilizer, due to the higher active ingredient concentration in order to comply with equal demands, about 35 to 40% less fertilizer has to be transported than in the case of superphosphates.

(4) Fertilizer prepared by mechanical activation contains dicalcium phosphate available to the plants. Drawing of this fertilizer from the soil is accomplished by aid of various huminic acids produced by the plants. The phosphorus content of dicalcium phosphate is not chemically bonded to the soil in contrast with the superphosphate, in which a part of the phosphorus content chemically reacts with certain compound contained in the soil and thus becomes unutilizable by the plants. Otherwise the mode of incorporation of phosphorus from dicalcium phosphate into the plants is the same as with the superphosphate.

(5) Plants are able to absorb about 6% more $P_2O_5$ from a fertilizer activated at an optimum collision speed than from traditional superphosphate, in case of equal demands.

(6) The fertilizer according to the invention can be applied to the fields either alone or in admixture with other fertilizers and other organic materials.

(7) From dicalcium phosphate prepared according to the invention, a complex fertilizer suspension having an optional composition can be prepared by adding fertilizer bases containing nitrogen and/or potassium.

(8) By a total mechanization a uniform application can be achieved which has the same technical and biological advantages as liquid fertilizers.

Further details of the invention are illustrated by the following non-limiting Examples.

EXAMPLE 1

Starting material: cola-apatite having a $P_2O_5$ concentration of 37.0% and monocalcium phosphate (superphosphate of commercial grade) having a $P_2O_5$ concentration of 21.0%.

Homogenization was accomplished taking care that the components should be used in stochiometric proportions.

In a mill having a desintegrator system used for activation, particles were allowed to collide at various predetermined speeds, namely at a speed of 40, 60, 70, 80, 90, 100, 120, 140, 160, and 180 m/sec.

A dicalcium phosphate-containing fertilizer having a $P_2O_5$ content of 30% was obtained. The stability of the product was controlled by X-ray diffraction measurements. Measurements carried out after some months verified that the starting material suffered a permanent transformation.

Field trials were carried out on various soils with the same plants and under the same conditions. In the first test no $P_2O_5$-containing fertilizer was added to the soil. In a second test monocalcium phosphate-containing, commercial grade superphosphate was employed and in a third one a dicalcium phosphate-containing fertilizer prepared according to the invention was applied to the soil. In the second and third experiment the quantities of $P_2O_5$ were identical.

From the evaluation of the results of the above experiments the following conclusions can be drawn.

(1) The qualitative and quantitative results obtained on the fields not treated with $P_2O_5$-containing fertilizers were sufficiently poorer than the corresponding cultivation parameters on the fields treated with the fertilizer prepared according to the invention.

(2) The qualitative and quantitative cultivation results achieved by means of dicalcium phosphate-containing fertilizers were at least equal to the results obtained in the fields fertilized with superphosphate. Moreover, when the activation was carried out at a collision speed of 80 to 110 m/sec, the fertilizers prepared according to the invention provided better results.

(3) It was also found that the quantity of $P_2O_5$ drawn by the plants from the soil was increased with increasing collision speeds up to a certain limit. The quantity of $P_2O_5$ drawn from a soil treated with a fertilizer which had been activated at a speed of 70 to 80 and 100 to 110 m/sec, respectively was approximately identical with the $P_2O_5$ quantity drawn from the soil treated with superphosphate. On the other hand, when activation was accomplished at a collision speed of 80 to 100 m/sec, this amount was about 6% higher in case of the soils treated with the fertilizer prepared according to the invention. The plant tests were performed with barley, oat and onion.

EXAMPLE 2

Marocco phosphorite was activated with monocalcium phosphate. The $P_2O_5$ concentration of phosphorite was 33.0% and that of monocalcium phosphate was 21.0%.

Prior to activation the two materials were admixed and homogenized in amounts according to the stochiometric proportions.

During activation the same collision speeds were used as in Example 1, and activation was performed in a disintegrator.

A dicalcium phosphate-containing fertilizer having a $P_2O_5$ concentration of 27.5% was obtained.

Field trials were accomplished as described in Example 1. It was found that the $P_2O_5$ amount drawn by the plants from the soil was increased parallel to increasing collision speeds in the range of 40 to 120 m/sec. The peak value was about 7 to 8% higher than the quantity absorbed from monocalcium phosphate under the same conditions.

Over 120 m/sec a slight decrease could be observed, the extent of which was smaller than in the experiments of Example 1. When the result obtained in the fields treated with monocalcium phosphate was 100%, a 20% decrease was detected.

EXAMPLE 3

A complex fertilizer suspension was prepared as described hereinbelow.

The following mixture was prepared:

| | |
|---|---|
| 215 g of urea | (50 g of nitrogen) |
| 158 g of potassium | (100 g of $K_2O$) |
| 357 g of activated dicalcium phosphate | (100 g of $P_2O_5$) |
| 270 g of water | |
| 1000 g of mixture | 250 g of active ingredient |

Urea and the potassium salt were of commercial grade Dicalcium phosphate was ground to a grain size of less than 500 microns. No suspending agent was necessary.

The suspension was prepared at room temperature by stirring the mixture with a laboratory stirrer. After 45 minutes of stirring a stable suspension was obtained. The sequence of the addition of the various components had no influence on the character of the end product. The active ingredient composition of the end product was as follows:

| | | |
|---|---|---|
| Nitrogen | (from urea) | 5% by weight |
| $K_2O$ | (in form of a potassium salt) | 10% by weight |
| $P_2O_5$ | (in form of a dicalcium phosphate containing fertilizer) | 10% by weight |
| | | 25% by weight |

The above percentage values are related to the total weight of the end product.

The above proportions can be varied depending on the active ingredient concentration of the starting substances.

If one or more of the components contains water, the quantity of the water added intentionally, is accordingly decreased, in an extreme case up to 0%.

The suspension obtained is stable, no sedimentation can be observed. The dicalcium phosphate—due to its citrate-soluble character—preserves its advantageous characteristics also in suspended form. The dicalcium phosphate prepared according to the invention can be used in all the complex fertilizer suspensions generally used in agriculture.

What we claim is:

1. A process for preparing a fertilizer containing dicalcium phosphate from a tricalcium phosphate of mineral origin, said preparing being in the presence of monocalcium phosphate, which process comprises granulating the grains of the sized or unsized phosphate of mineral origin which are larger than 5 mm to a grain size of 1 to 4 mm, admixing the mineral phosphate with monocalcium phosphate and activating the phosphate crystals such that defects are formed in the crystal lattice of the resulting phosphate by colliding the grains of the mixture with each other at a speed of 70 to 120 m/sec for a time sufficient to prepare said fertilizer containing dicalcium phosphate.

2. The process, according to claim 1, in which grains greater than 5 mm are granulated to a size of 2 to 3 mm.

3. The process, according to claim 1, in which the grains of the mixture are collided at a speed of 80 to 100 m/sec.

4. The process, according to claim 1, wherein the monocalcium phosphate is employed in a stoichiometric amount calculated for the transformation of tricalcium phosphate into dicalcium phosphate.

5. The process, according to claim 1, wherein the grains of the mixture upon collision are subjected to a combination of shearing and/or pressure or collision stresses.

6. The process, according to claim 5, in which a beating-blade mill is employed to effect collision of the grains of the mixture.

7. The process, according to claim 6, in which said beating-blade mill has a disintegrator system.

8. The process, according to claim 1, in which superphosphate of commercial grade is employed as the monocalcium phosphate.

9. The process, according to claim 1, further including the step of adding nitrogen- and or potassium-containing fertilizer bases to the activated phosphate crystals to produce a combined fertilizer.

* * * * *